(12) United States Patent
Lee et al.

(10) Patent No.: US 11,270,804 B2
(45) Date of Patent: Mar. 8, 2022

(54) FUEL ASSEMBLY DESIGN CONCEPT AND MIXED CYCLE LENGTH OPERATION METHOD FOR LONG CYCLE LENGTH PRESSURIZED WATER REACTOR OPERATION

(71) Applicant: Ulsan National Institute of Science and Technology, Ulsan (KR)

(72) Inventors: Deokjung Lee, Ulsan (KR); Eun Jeong, Ulsan (KR); Jiwon Choe, Ulsan (KR); Soo Young Choi, Ulsan (KR); Jinsu Park, Ulsan (KR); Jaerim Jang, Ulsan (KR); Peng Zhang, Ulsan (KR)

(73) Assignee: ULSAN NATIONAL INSTITUTE OF SCIENCE AND TECHNOLOGY, Ulsan (KR)

( * ) Notice: Subject to any disclaimer, the term of this patent is extended or adjusted under 35 U.S.C. 154(b) by 348 days.

(21) Appl. No.: 16/294,967

(22) Filed: Mar. 7, 2019

(65) Prior Publication Data
US 2019/0279780 A1    Sep. 12, 2019

(30) Foreign Application Priority Data
Mar. 8, 2018   (KR) .................. 10-2018-0027313

(51) Int. Cl.
| G21C 3/335 | (2006.01) |
| G21C 19/19 | (2006.01) |
| G21C 1/08  | (2006.01) |
| G21D 3/02  | (2006.01) |
| G21C 3/334 | (2006.01) |
| G21C 3/32  | (2006.01) |
| G21C 3/326 | (2006.01) |
| G21C 5/18  | (2006.01) |
| G21C 1/32  | (2006.01) |

(52) U.S. Cl.
CPC ............ *G21C 19/19* (2013.01); *G21C 1/086* (2013.01); *G21C 3/32* (2013.01); *G21C 3/3265* (2019.01); *G21C 3/334* (2013.01); *G21C 5/18* (2013.01); *G21D 3/02* (2013.01); *G21C 1/32* (2013.01); *G21C 3/335* (2013.01)

(58) Field of Classification Search
None
See application file for complete search history.

(56) References Cited

U.S. PATENT DOCUMENTS

| 7,480,599 | B2 * | 1/2009 | Russell, II | ............. G21D 3/001 703/2 |
| 10,818,403 | B2 * | 10/2020 | Kitto | .................... G21C 19/205 |
| 2017/0301419 | A1 * | 10/2017 | Hen | ......................... G21C 5/18 |

OTHER PUBLICATIONS

Ho Cheol Shin et al, Impact of UO2 Enrichment of Fuel Zoning Rods in Long Cycle Operation of PWR, Transactions of the Korean Nuclear Society Autumn Meeting, Oct. 27, 2016, pp. 1-3, Republic of Korea.

* cited by examiner

*Primary Examiner* — Lily C Garner
(74) *Attorney, Agent, or Firm* — Foundation Law Group, LLP

(57) ABSTRACT

In a pressurized water reactor operation method, a fuel assembly including first fuel rods that operates for a preset first operation time and second fuel rods that operates for a second operation time longer than the first operation time is prepared. An operation schedule of a pressurized water reactor is created by mixing the first operation time of the first fuel rods and the second operation time of the second fuel rods. The pressurized water reactor operates by repeating the operation schedule.

5 Claims, 4 Drawing Sheets

FUEL ASSEMBLY DESIGN CONCEPT AND MIXED CYCLE LENGTH OPERATION METHOD FOR LONG CYCLE LENGTH PRESSURIZED WATER REACTOR OPERATION

CROSS-REFERENCE TO RELATED APPLICATION

This application is based on and claims priority from Korean Patent Application No. 10-2018-0027313, filed on Mar. 8, 2018, the disclosure of which is incorporated herein in its entirety by reference for all purposes.

FIELD OF THE INVENTION

The present disclosure relates to a pressurized water reactor; and, more particularly, to a fuel assembly for a long period operation of a pressurized water reactor and a mixed cycle length operation method, which can improve a nuclear reactor operation efficiency by providing an additional operation cycle of a nuclear reactor in consideration of an inactivation period that inevitably occurs at the time of exchanging a nuclear fuel and applying a nuclear fuel loading technique capable of employing the additional operation cycle.

BACKGROUND OF THE INVENTION

Generally, a pressurized water reactor refers to a nuclear reactor that uses pressurized water as a coolant and a neutron moderator.

The fuel used in the pressurized water reactor, i.e., 3 to 5% U-235 enriched uranium dioxide ($UO_2$) powder, is sintered to a cylindrical sintered body having a diameter of about 8 to 9 mm and a length of about 10 mm.

The sintered body is stacked in a cladding tube having a diameter of about 9.5 to 10.2 mm at a height of about 3600 to 3800 mm. Then, a plenum having a length of about 200 to 200 mm is formed on the sintered body stack to collect fission gas. In order to promote heat transfer, helium is injected into a rod and both ends of the rod are sealed by welding.

A fuel assembly is formed by loading the fuel rod to a nuclear fuel assembly frame including an upper fixing part, a lower fixing part, a guide pipe, a measuring pipe, a support grid, and the like. The fuel assembly thus formed is loaded to a reactor core.

In the pressurized water reactor, once a nuclear fuel is loaded into the nuclear reactor, all the nuclear fuel is fixed and burned until the end of the operation cycle. The reactor has an operation cycle of about 18 months. At the end of the cycle at which all the loaded nuclear fuel is burned, the nuclear fuel that has combustion performance no more is taken out of the reactor and a new nuclear fuel is loaded.

In general, it takes one month to replace the nuclear fuel and perform the maintenance of the nuclear reactor. During this period, the nuclear power plant stops and cannot produce electricity.

In other words, in a conventional case, an operation cycle of 18 months is uniformly applied to one reactor core (replacing ⅓ of the fuel in the fuel rod with a new fuel every 18 months) and, thus, the improvement of the nuclear fuel operation efficiency is limited.

SUMMARY OF THE INVENTION

In view of the above, the present disclosure provides a fuel assembly for a long period operation of a pressurized water reactor and a mixed cycle length operation method, which can additionally ensure an operation cycle of a nuclear reactor in consideration of an inactivation period that inevitably occurs at the time of exchanging a nuclear fuel and improve a nuclear reactor operation efficiency by applying a nuclear fuel loading technique capable of employing the additionally ensured operation cycle.

In accordance with an aspect, there is provided a fuel assembly provided in a pressurized water reactor, comprising: first fuel rods that operate for a preset first operation time and second fuel rods that operate for a second operation time longer than the first operation time, wherein the pressurized water reactor operates by an operation schedule determined in consideration of the first operation time of the first fuel rods and the second operation time of the second fuel rods.

Each of the first fuel rods and the second fuel rods may include fuel rods of a first group that are not used and fuel rods of a second group that are used once. After the pressurized water reactor operates for a first cycle of a preset period of time, the fuel rods of the second group are separated from the fuel assembly and discharged to the outside of the pressurized water reactor. After the first cycle operation is completed, a first number of fuel rods among the fuel rods of the first group are moved to a region where the fuel rods of the second group are to be arranged in the fuel assembly, and a second number of fuel rods that are the remaining fuel rods of the first group are separated from the fuel assembly and discharged to the outside of the pressurized water reactor. After new fuel rods that are not used are loaded in a region where the fuel rods of the first group are to be arranged and the pressurized water reactor operates for a second cycle of a preset period of time, a part of the second number of fuel rods and the new fuel rods arranged in the region of the first group are moved to the region where the fuel rods of the second group are to be arranged. New fuel rods that are not used are loaded in the region where the fuel rods of the first group are to be arranged and the pressurized water reactor operates for a third cycle of a preset period of time.

The fuel rods of the first group and the fuel rods of the second group may be alternately arranged in an outward direction from a central position in the fuel assembly without being consecutively arranged horizontally.

In the first cycle and the second cycle, the first group may include 101 fuel rods and the second group may include 76 fuel rods, and in the third cycle, the first group may include 57 fuel rods, the second group may include 104 fuel rods, and the first fuel rods may further include 16 fuel rods that are used twice.

In accordance with another aspect, there is provided a method for operating a pressurized water reactor comprising: preparing a fuel assembly including first fuel rods that operate for a preset first operation time and second fuel rods that operate for a second operation time longer than the first operation time; creating an operation schedule of a pressurized water reactor by mixing the first operation time of the first fuel rods and the second operation time of the second fuel rods; and operating the pressurized water reactor by repeating the operation schedule.

The operating the pressurized water reactor by repeating the operation schedule may include: operating the pressurized water reactor for a first cycle of a predetermined period of time by using a fuel assembly including fuel rods of a first group that are not used and fuel rods of a second group that are used once; separating, after the first cycle operation is completed, the fuel rods of the second group from the fuel assembly and discharging the fuel rods of the second group to the outside of the pressurized water reactor; moving, after the first cycle operation is completed, a first number of fuel rods among the fuel rods of the first group to a region where the fuel rods of the second group are to be arranged in the fuel assembly; separating a second number of fuel rods that are the remaining fuel rods of the first group from the fuel assembly and discharging the second number of fuel rods to the outside of the pressurized water reactor; loading new fuel rods that are not used in a region where the fuel rods of the first group are to be arranged and operating the pressurized water reactor for a second cycle of a preset period of time; moving, after the second cycle operation is completed, a part of the second number of fuel rods and the new fuel rods arranged in the region of the first group to a region where the fuel rods of the second group are to be arranged; and loading a preset number of new fuel rods that are not used in the region where the fuel rods of the first group are to be arranged and operating the pressurized water reactor for a third cycle of a preset period of time.

The second fuel rods may have uranium enrichment that allows a long period of operation of 24 months. The uranium enrichment may range from 4.7 to 4.95 w/o.

The first cycle and the second cycle may be 24 months, and the third cycle may be 18 months.

The first cycle, the second cycle, and the third cycle may form one operation schedule, and the pressurized water reactor operates by repeating the one operation schedule.

The remaining fuel rods among the second number of fuel rods may be loaded in the region where the fuel rods of the second group are to be arranged before the first cycle operation of a next operation schedule subsequent to the one operation schedule.

In accordance with the present disclosure, in a fuel assembly for a long period operation of a pressurized water reactor and a mixed cycle length operation method, it is possible to improve a nuclear reactor operation efficiency by providing an additional operation cycle of a nuclear reactor in consideration of an inactivation period that inevitably occurs at the time of exchanging a nuclear fuel and applying a nuclear fuel loading technique capable of employing the additional operation cycle.

BRIEF DESCRIPTION OF THE DRAWINGS

The objects and features of the present disclosure will become apparent from the following description of embodiments, given in conjunction with the accompanying drawings, in which.

DETAILED DESCRIPTION OF THE EMBODIMENTS

Hereinafter, the operation of the present disclosure will be described in detail with reference to the accompanying drawings. In describing the embodiments of the present disclosure, if it is determined that detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition thereof may be made on a basis of the content throughout the specification.

Figure 1:
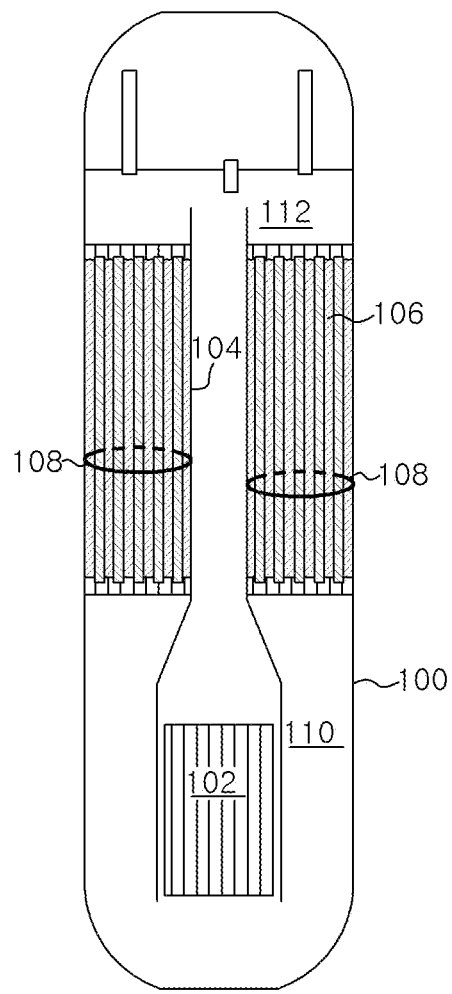
FIG. 1 shows a cross sectional structure of a pressurized water reactor to which an embodiment of the present disclosure is applied.

FIG. 1 shows a cross sectional structure of a pressurized water reactor to which an embodiment of the present disclosure is applied.

Hereinafter, the operations of the components of the pressurized water reactor to which the embodiment of the present disclosure is applied will be described in detail with reference to FIG. 1.

First, the pressurized water reactor includes a vertical cylindrical pressure vessel 100.

A fuel assembly 102 loaded with fuel rods is provided in the pressure vessel 100. The fuel assembly 102 includes a plurality of fuel rods in light water ($H_2O$) and is disposed at a lower portion in the pressure vessel 100.

The fuel rods can be enriched with uranium 235 at a preset ratio. In a conventional case, the fuel rods are enriched with uranium 235 at 2% to 3% and can operate for 18 months. However, in the case of operating the fuel rods for 18 months, the improvement of the efficiency of the fuel assembly 102 is limited as described above.

Therefore, in the embodiment of the present disclosure, the fuel rods are enriched with 4.5% to 4.95% uranium to increase the operation period of the fuel assembly 102 to 24 months longer than the conventional operation period of 18 months.

A cylindrical central riser 104 is concentrically disposed in the pressure vessel 100 and cooling water heated by the fuel assembly 102 can be moved through the cylindrical central riser 104 to the upper portion of the pressure vessel 100.

A steam generator 106 surrounds the cylindrical central riser 104 between a lower space 110 and an upper space 112 in the pressure vessel 100.

The steam generator 106 includes a plurality of tubes 108. The cooling water moves from the upper space 112 to the lower space 110 in the pressure vessel 100 through the tubes 108. Therefore, when the operation of the fuel assembly 102 is started, the cooling water heated by the fuel assembly 102 is moved to the upper portion of the pressure vessel 100 through the cylindrical central riser 104 and then moved to the lower portion of the pressure vessel 100 through the tubes 108 of the steam generator 106. The heated cooling water becomes steam while passing through the tubes 108 to be applied to a turbine (not shown) outside the pressurized water reactor, thereby generating power.

Figure 2:
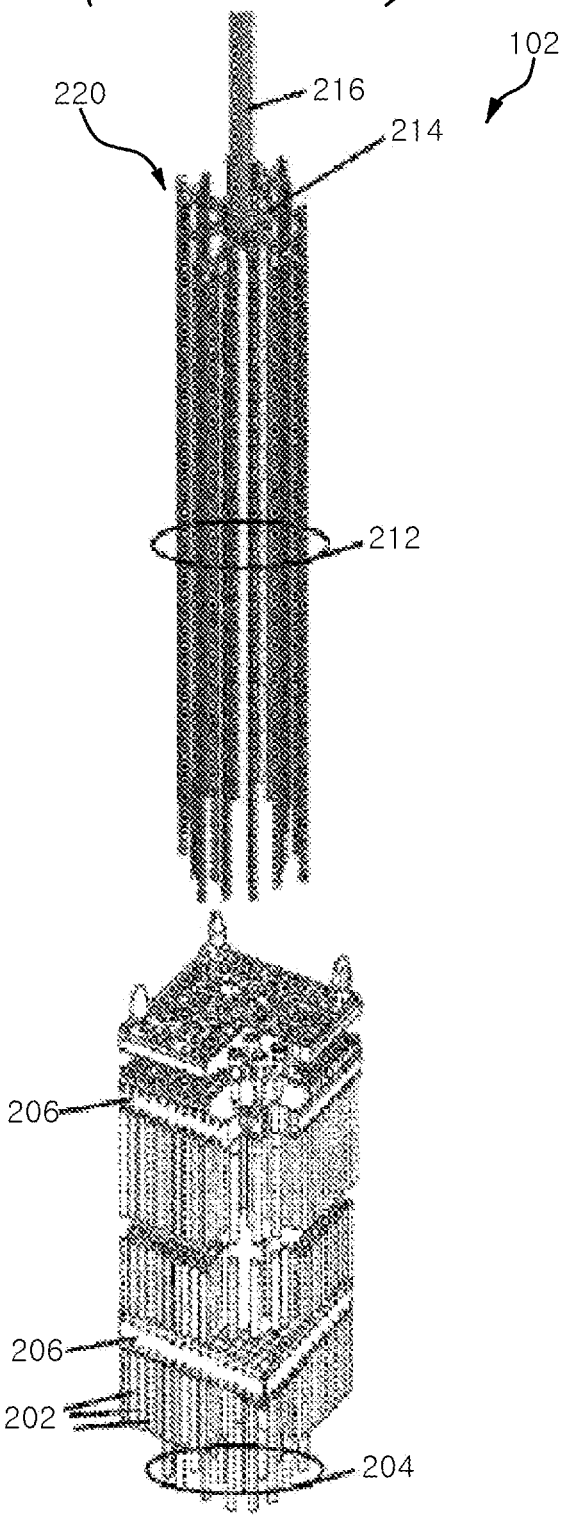
FIG. 2 is a detailed block diagram of a fuel assembly according to an embodiment.

FIG. 2 is a detailed block diagram of the fuel assembly shown in FIG. 1. Hereinafter, the operations of the components of the fuel assembly according to the embodiment of the present disclosure will be described in detail with reference to FIG. 2.

First, the fuel assembly 102 includes a plurality of vertically arranged fuel rods 202. The fuel rods 202 in the fuel assembly 102 may be enriched with 4.5% to 4.95% uranium 235 for a long period operation of 18 months or more.

Guide tubes 204 are provided between the fuel rods 202 and allow control rods 212 to be loaded into or unloaded from the fuel assembly 102.

A plurality of spacer grids 206 fixes the fuel rods 202 in the fuel assembly 102.

A control rod assembly 220 includes the control rods 212 connected to a connecting rod 216 by yokes or spiders 214. The control rods 212 are loaded or unloaded through the spaces between the fuel rods 202 in the fuel assembly 102 by predetermined control, thereby controlling the fission reaction rate of the fuel rods 202 in the fuel assembly 102. At this time, the connecting rod 216 is connected to a control rod drive mechanism (CRDM) (not shown) and vertically moved under the control of the CRDM. Accordingly, the control rods 212 are loaded or unloaded through the spaces between the fuel rods 202 in the fuel assembly 102.

FIG. 2 shows a state in which the control rod assembly 220 is completely separated from the fuel assembly 102. When the control rod assembly 220 is completely separated from the fuel assembly 102, the fission reaction in the fuel rods 202 in the fuel assembly 102 is maximized.

If it is required to slow down the reaction rate in the fuel rods 202, the CRDM moves the control rod assembly 220 downward so that the lower ends of the control rods 212 of the control rod assembly 220 can be loaded into the spaces between the fuel rods 202 in the fuel assembly 102 through the guide tubes 204 in the fuel assembly 102.

At this time, the control rods 212 contain a neutron poison. Therefore, the control rods 212 loaded into the fuel assembly 102 absorb a part of neutrons generated from the fuel rods 202 due to the fission reaction. Accordingly, the fission reaction rate of the fuel assembly 102 can be slowed down.

Figure 3:
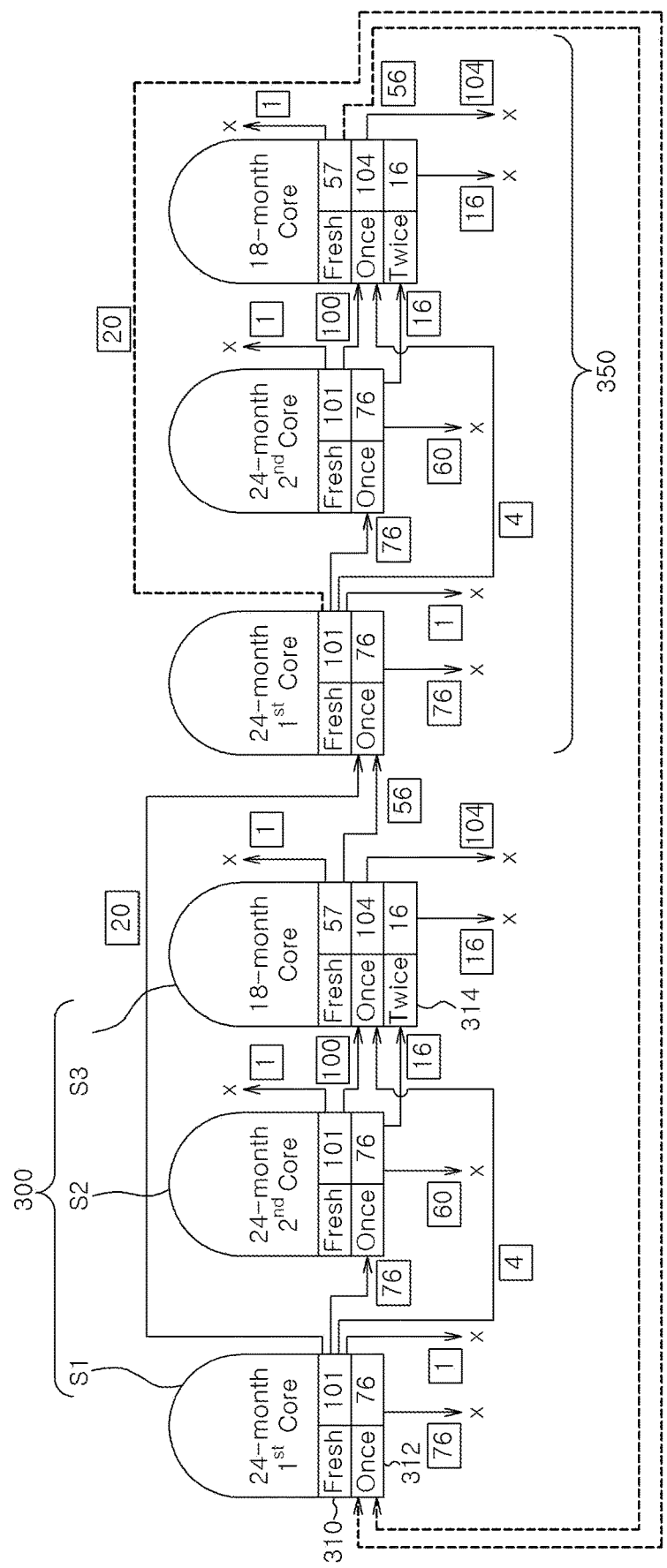
FIG. 3 shows an example of a method for executing a mixed cycle length operation using a nuclear fuel assembly including a pressurized water reactor enriched with uranium according to an embodiment.

FIG. 3 shows a mixed cycle length operation method using a fuel assembly highly enriched with uranium in a pressurized water reactor according to an embodiment of the present disclosure.

Hereinafter, a mixed cycle length operation method according to an embodiment of the present disclosure will be described in detail with reference to FIGS. 1 to 3.

Conventionally, the core is divided into a group A, a group B, and a group C, and ⅓ of the core is loaded at one time. In the present disclosure, the core is divided into a group A and a group B. ⅔ of the fuel assembly is used and, then, ⅓ of the fuel assembly is used. At this time, if the group C is not used, the efficiency deteriorates. In order to effectively use the fuel in the fuel rods, a 18-month operation is mixed with a 24-month operation. Accordingly, the fuel efficiency can be further improved by using the fuel rods with shorter cycles.

In other words, as shown in FIG. 3, in the embodiment of the present disclosure, the pressurized water reactor repeats a first set of mixed cycle length operation 300 and a second set of mixed cycle length operation 350, each including a first cycle S1 of 24 months, a second cycle S2 of 24 months, and a third cycle S3 of 18 months.

Figure 4:
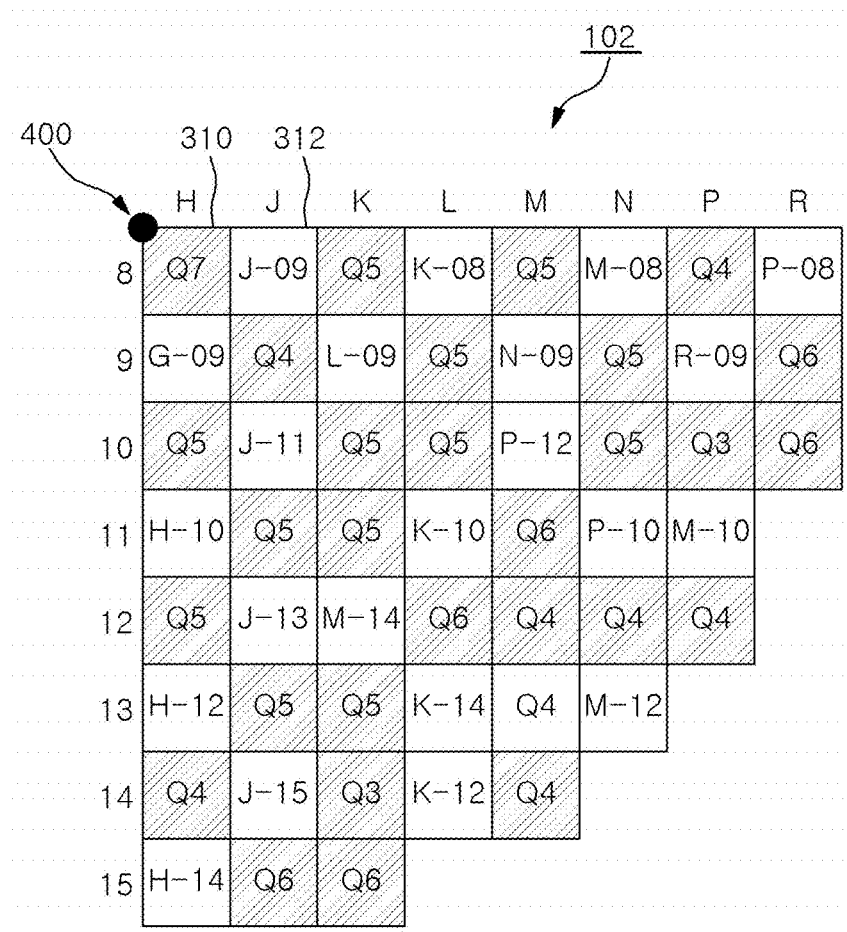
FIG. 4 shows a loading model of the fuel assembly according to an embodiment.

In that case, the fuel rods 202 may include fuel rods (fresh) 310 of a first group that are not used and fuel rods (once) 312 of a second group that are used once. In the arrangement of the fuel rods (fresh) 310 of the first group and the fuel rods (once) 312 of the second group, as shown in FIG. 4 illustrating a loading pattern of the fuel assembly according to the embodiment of the present disclosure, the fuel rods (fresh) 310 of the first group and the fuel rods (once) 312 of the second group may be alternately arranged in an outward direction from the central position 400 in the entire region of the fuel assembly 100. Further, the fuel rods (fresh) 310 of the first group and the fuel rods (once) 312 of the second group may be concentrically arranged about the central position 400 without being consecutively arranged horizontally.

Hereinafter, the arrangement of the fuel rods will be described in detail with reference to FIG. 4. In FIG. 4, only ¼ of the fuel assembly in which the fuel rods (fresh) 310 of the first group and the fuel rods (once) 312 of the second group are concentrically arranged about the central position 400 is illustrated as an example.

In the conventional 18-month operation, fresh fuels, once-burned fuels, twice-burned fuels are arranged in the fuel assembly. However, in the 24-month operation according to the embodiment of the present disclosure, fresh fuels, i.e., the fuel rods (fresh) 310 of the first group and, and once-burned fuels, i.e., the fuel rods (once) 312 of the second group are used. Two types of fuel rods are used for the 24-month operation of which nuclear fuel efficiency is similar to that of the 18-month operation. In the case of using two types of fuels, it is preferable to set the uranium enrichment of the nuclear fuel to 4.7 to 4.95 w/o that is relatively higher than 4.65 w/o (enrichment in the 18-month operation).

Hereinafter, the mixed cycle length operation method will be described more. In the first cycle S1 of the first set of mixed cycle length operation 300, the pressurized water reactor operates for the first cycle S1 of a preset period of time by using the fuel assembly 100 including the fuel rods 310 of the first group that are not used and the fuel rods 312 of the second group that are used once.

At this time, the first cycle may be a cycle of operating the pressurized water reactor for 24 months. After 101 new fuel rods are loaded as the fuel rods 310 of the first group and 76 nuclear fuel rods that are used once in the previous cycle are loaded as the fuel rods 312 of the second cycle, the pressurized water reactor operates for the first cycle.

Upon completion of the first cycle operation, the fuel rods 312 of the second group are separated from the fuel assembly 102 and discharged to the outside of the pressurized water reactor. Further, upon completion of the first cycle operation, a first number of fuel rods among the fuel rods 310 of the first group are moved to a region where the fuel rods 312 of the second group in the fuel assembly 102 are to be arranged.

A second number of fuel rods that are the remaining fuel rods 310 of the first group are separated from the fuel assembly 102 and discharged to the outside of the pressurized water reactor, and new fuel rods that are not used are loaded in a region where the fuel rods 310 of the first group are to be arranged. In that state, the pressurized water reactor operates for the second cycle S2 of a preset period of time.

For example, 101 new fuel rods loaded as the fuel rods 310 of the first group are used once in the first cycle. Among the 101 fuel rods that are used once, 76 fuel rods are selected and loaded as the fuel rods 312 of the second group. The remaining 25 fuel rods are separated from the fuel assembly 102 in the third cycle S3 and stored separately. Among the 25 fuel rods, four fuel rods are loaded as the fuel rods 312 of the second group in the third cycle operation, and twenty fuel rods are loaded as the fuel rods 312 of the second group in the first cycle operation of the second set of mixed cycle length operation 350. In other words, the first number of the fuel rods may be, e.g., 76, and the second number of the fuel rods may be 25. The 25 fuel rods that are used once are stored separately and used in a next cycle.

At this time, one of the 25 fuel rods that are used once is discarded. This is because it is difficult to design a safety device since loading of one fuel rod that is used once during the operation of the nuclear reactor is improper when considering the ¼ symmetry operation of the nuclear reactor.

The 76 fuel rods used as the fuel rods 312 of the second group in the first cycle are separated from the fuel assembly 102 and discharged to the outside the pressurized water reactor. At this time, the second cycle may be a cycle of operating the pressurized water reactors for 24 months.

Upon completion of the second cycle operation, a part of the second number of fuel rods that are stored after the first cycle operation and the fuel rods 310 that are newly arranged in the region of the first group and used once in the second cycle operation are moved to the region where the fuel rods 312 of the second group are to be arranged. A preset number of new fuel rods that are not used are loaded in the region where the fuel rods 301 of the first group are to be arranged, and the pressurized water reactor operates for the third cycle of a preset period of time.

For example, 101 new fuel rods loaded as the fuel rods 310 of the first group are used once in the second cycle operation. One of the 101 fuel rods that are used once is discarded and the remaining 100 fuel rods are loaded as the fuel rods 312 of the second group in the third cycle. Upon completion of the first cycle operation, among the fuel rods 310 of the first group, 25 fuel rods 310 that are used once are stored. Among the 25 fuel rods, four fuel rods are loaded as the fuel rods 312 of the second group in the third cycle. Therefore, 104 fuel loads in total are loaded as the fuel rods 312 of the second group in the third cycle.

Further, 57 new fuel rods that are not used are loaded in the region where the fuel rods 310 of the first group are to be arranged. Among the 76 fuel rods used as the fuel rods of the second group in the second cycle, 16 fuel rods are loaded as fuel rods 314 of a third group in the third cycle. At this time, the third cycle may be a cycle of operating the pressurized water reactor for 18 months.

After the third cycle operation of 18 months, in the first cycle of the second set of mixed cycle length operation 350, 20 fuel rods that are used once in the first cycle of the first set of mixed cycle length operation 300 and stored are loaded as the fuel rods of the second group, and 56 fuel rods that are used once in the third cycle are loaded as the fuel rods of the second group. Therefore, 76 fuel rods in total are loaded. 101 new fuel rods are loaded as the fuel rods of the first group, and the pressurized water reactor operates in the first cycle of the second set of mixed cycle length operation. Accordingly, the pressurized water reactor operates in the same manner as in the first set of mixed cycle length operation. In other words, the pressurized water reactor operates by repeating the first set of mixed cycle length operation 300 and the second set of mixed cycle length operation 350.

In the case of improving the nuclear fuel efficiency by increasing the uranium enrichment of the fuel rods and increasing the operation cycle of the nuclear reactor, if the operation cycle is fixed to 24-24-24 months, the fuel rods used once in the first cycle cannot be used in the last 24-month cycle and thus are discarded after one cycle. Therefore, in the embodiment of the present disclosure, the efficiency of the fuel rods can be improved by setting the operation cycle of the nuclear reactor in the third cycle to 18 months and allowing the fuel rods that are used once can be reused in a next cycle. When the operation cycle of the nuclear reactor is 18 months, the fuel rods that are used once or twice are reused. Among the fuel rods that are used once or twice, the fuel rods that were relatively close to the central position of the nuclear reactor are reused in the 18-month operation, which makes it possible to improve the efficiency of the fuel rods.

In other words, in the conventional case, one fuel assembly can be used for 54 months (18-18-18 months). However, when the operation cycle of the nuclear reactor is fixed to 24 months as in the present disclosure, only two cycles are used and, thus, the operation cycle of the fuel rods becomes 48 months (24 months+24 months), which is less effective compared to when one fuel rod is used for 54 months.

By mixing the 18-month operation cycle with the 24-month operation as in the embodiment of the present disclosure, the cycle of 24-24-18 months is executed and one fuel rod can be used for 66 months. In other words, when the 24-month operation is continued, the amount of nuclear fuel that is not burned and discarded increases. Therefore, the 18-month operation is mixed with the 24 month-operation to provide a nuclear fuel that can be burned for about 18 months but cannot be burned for 24 months. Since the pressurized water reactor operates in a mixed cycle, the nuclear fuel can be used more efficiently.

As described above, in accordance with the present disclosure, in a fuel assembly for a long period operation of a pressurized water reactor and a mixed cycle length operation method, it is possible to improve a nuclear reactor operation efficiency by providing an additional operation cycle of a nuclear reactor in consideration of an inactivation period that inevitably occurs at the time of exchanging a nuclear fuel and applying a nuclear fuel loading technique capable of employing the additional operation cycle.

While the present disclosure has been shown and described with respect to the embodiments, various modifications may be made without departing from the scope of the present disclosure. Therefore, the scope of the present disclosure should be defined by the scope of the claim without being limited by the above-described embodiments.

What is claimed is:

1. A method for operating a pressurized water reactor operation, comprising: preparing a fuel assembly including a fresh fuel rods that operate for a preset first operation time and once-used fuel rods that operate for a second operation time longer than the first operation time; creating an operation schedule of the pressurized water reactor based upon the first operation time of the fresh fuel rods and the second operation time of the once-used fuel rods; and operating the pressurized water reactor by repeating the operation schedule, wherein the operating the pressurized water reactor by repeating the operation schedule includes: operating the pressurized water reactor for a first cycle of a predetermined period of time by using a fuel assembly including a first set of the fresh fuel rods in a first region and a first set of the once-used fuel rods in a second region; after the first cycle operation is completed, discharging the first set of the once-used fuel rods to the outside of the pressurized water reactor; loading, after the first cycle operation is completed, a first portion of the first set of the fresh fuel rods into the second region in the fuel assembly; discharging a second portion of the first set of fresh fuel rods to the outside of the pressurized water reactor; loading a second set of the fresh fuel rods into the first region and operating the pressurized water reactor for a second cycle of a preset period of time; loading, after the second cycle operation is completed, a second set of fresh fuel rods into the second region; and a third set of the fresh fuel rods into the first region and operating the pressurized water reactor for a third cycle of a preset period of time.

2. The method of claim 1, wherein the second fuel rods have uranium enrichment that allows a long period of operation of 24 months.

3. The method of claim 2, wherein the uranium enrichment ranges from 4.7 to 4.95 wt. %.

4. The method of claim 1, wherein the first cycle and the second cycle are 24 months, and the third cycle is 18 months.

5. The method of claim 1, wherein the first cycle, the second cycle, and the third cycle form one operation schedule, and the pressurized water reactor operates by repeating the one operation schedule.

\* \* \* \* \*